United States Patent [19]

Cross

[11] Patent Number: 4,577,705
[45] Date of Patent: Mar. 25, 1986

[54] BELLOWS LUBRICANT PRESSURIZER FOR SEALED BEARING ROCK BITS

[75] Inventor: Donald G. Cross, Laguna Beach, Calif.

[73] Assignee: Smith International, Inc., Newport Beach, Calif.

[21] Appl. No.: 602,771

[22] Filed: Apr. 23, 1984

[51] Int. Cl.⁴ .............................................. E21B 9/08
[52] U.S. Cl. ................................. 175/228; 175/371; 184/54; 384/93
[58] Field of Search ...................... 175/227, 228, 371; 184/39, 54; 384/93

[56] References Cited

U.S. PATENT DOCUMENTS

| | | | |
|---|---|---|---|
| 3,476,195 | 11/1969 | Galle | 175/228 |
| 3,721,306 | 3/1973 | Sartor | 384/93 |
| 3,847,234 | 11/1974 | Schumacher, Jr. et al. | 384/93 |
| 3,866,695 | 2/1975 | Jackson | 175/228 |
| 4,161,223 | 7/1979 | Oelke | 175/228 |
| 4,276,946 | 7/1981 | Millsapps, Jr. | 175/228 |
| 4,388,984 | 6/1983 | Oelke | 175/228 |

FOREIGN PATENT DOCUMENTS

| | | | |
|---|---|---|---|
| 2332737 | 8/1974 | Fed. Rep. of Germany | 175/228 |
| 7809267 | 5/1979 | Netherlands | 175/228 |
| 486127 | 1/1976 | U.S.S.R. | 175/228 |

Primary Examiner—James A. Leppink
Assistant Examiner—William P. Neuder
Attorney, Agent, or Firm—Robert G. Upton

[57] ABSTRACT

This invention discloses the utilization of a metal bellows in a grease reservoir cavity that is compressed during a rock bit grease filling process to create a positive pressure differential between the internal cavities in the bit and the outside atmosphere.

6 Claims, 2 Drawing Figures

BELLOWS LUBRICANT PRESSURIZER FOR SEALED BEARING ROCK BITS

BACKGROUND OF THE INVENTION

1. Field of the Invention

The present invention relates generally to sealed rotary rock bits and, more particularly, to a means to pressurize the lubrication systems utilized in such bits.

2. Description of the Prior Art

A rotary rock bit generally consists of a main bit body adapted to be connected to a rotary drillstring. A conventional bit usually includes two or more legs integrally connected to form a bit body. Each leg includes a cutter, rotatably mounted on a journal pin, extending from the leg. Bearings are provided between the cutter and the journal pin to promote rotation of the cutter and means are provided on the outer surface of the cutter for disintegrating the formation as the bit and cutter rotate.

In lubricated rock bits, a typical lubrication system is provided which includes an annular seal located at or near the backface of the cutter cone to prevent the lubricant from leaking from the bearing area to the exterior of the rock bit and to prevent drilling fluid and debris from entering the bearing area. The lubrication system further includes a reservoir filled with a lubricant, typically a high viscosity petroleum grease, with passages provided to communicate the reservoir with the bearing space between the cutter cone and the journal pin.

Compensators are utilized within the prior art that function to equalize the pressure on the "mud" side of the seal with the pressure on its lubricant side under varying pressure conditions. U.S. Pat. No. 3,476,195 describes a low pressure relief valve which functions to relieve excessive gas pressures in the bit during normal drilling. However, during the raising and lowering of the drill bit into an existing borehole, a substantial pressure differential can develop. Providing a low pressure relief system would not operate properly because the relief valve would open prematurely before deleterious pressure differentials are reached. Therefore, too much lubricant would be lost during the drill bit lowering operation.

U.S. Pat. No. 4,161,223, assigned to the same assignee as the present invention, teaches the use of a pressure relief valve for sealed bearing rock bits. A sealed bearing rotary cone rock bit is disclosed in which a combined manual venting and pressure relief system is located within the lubrication reservoir of the rock bit. The rock bit comprises a main bit body having a plurality of legs extending downwardly therefrom. Each leg has a rolling cone cutter rotatively mounted thereon. A lubrication system is provided in each leg to provide lubricant to the bearing area between the cutter and the leg. The lubrication system includes a lubricant reservoir chamber that communicates via passageways with the bearing area. The reservoir further includes a rubber boot molded around a metal stiffener sleeve. A cover cap is attached to the rubber boot. The rubber boot is in the form of a resilient membrane and is exposed through the cover cap to the exterior of the rock bit and through the passageways to the interior of the lubrication bearing area. The vent and pressure relief system comprises an annular seat formed in the wall of the reservoir. A valve face is formed on the rubber boot and is biased against the annular seat by means of a belleville spring acting on the cover cap. If excessive pressure develops within the lubricant reservoir, the excess is blown off through the valve seat. Excessive internal pressures can also be manually vented safely by a slight prying action on the cover cap without removal of the cover cap.

The system just described is a relatively high pressure system which compensates for internal and external pressures. However, where there is zero pressure differential during operation of the bit, there is still a danger of detritus entering through the dynamic seal face formed between the cone and the journal to the internal lubricant passages. Any water or debris within the bearing surfaces formed between the journal pin and the rotary cones will quickly cause catastrophic destruction of the bit.

A means is provided within the reservoir cavity to pressurize the viscous grease within the seal lubrication system. By pressurizing the internal lubrication system, detritus or debris is prevented from passing by the seal between the cutter cone and the journal pin due to the increased pressure within the lubrication system. Thus, a positive differential pressure is created across the dynamic seal between the bearing pin and the bearings of the cutter cone.

Therefore, the present invention is an improvement over the prior art in that the internal lubricant passages are pressurized to prevent detritus or mud from entering the bearing surfaces during operation of the bit.

SUMMARY OF THE INVENTION

It is an object of this invention to provide a means to internally pressurize a sealed bearing rotary cone rock bit.

More particularly, it is an object of this invention to internally pressurize a grease reservoir within a sealed bearing rock bit by utilizing a compressed metal bellows to create an internal pressure differential to prevent detritus from passing by the rotary cone seals in the bit to the bearing surfaces formed between the cone and its journal.

Therefore, the present invention teaches a means to pressurize a bearing lubrication system for a sealed bearing rock bit having at least one cutter cone rotatively secured thereto. The rock bit body forms a grease reservoir chamber which is in communication with bearing surfaces formed between the at least one cutter cone and a bearing journal extending from the bit body through conduit means between the grease reservoir and the bearing surfaces. A seal is provided between the rotary cutter cone and the journal. A pressure responsive cover cap, adapted to release internal bit pressure at a predetermined pressure differential across the cover cap, closes out the grease reservoir chamber. A lubricant is admitted to the internal cavities; namely, the reservoir chamber, the conduit means, and the bearing surfaces; to provide a source of lubricant for the sealed bearing rotary cone rock bit. A means to pressurize the lubricant is provided within the reservoir chamber to pressurize the lubrication system to establish a positive internal pressure differential within the rock bit to prevent liquid and detritus from entering the bit past the rotary cone seals (or the cover cap) to the bearing surfaces during operation of the rock bit.

An advantage, therefore, of the present invention over the prior art is the ability to internally pressurize the sealed bearing rock bit to prevent fluid or solid detritus from passing by the seals to the bearing surfaces, thus preventing catastrophic failure of the bit through the admittance of the detritus to the bearing surfaces.

Yet another advantage of the present invention over the prior art is the ability to stabilize the seal between the rotary cone and its respective journal to prevent "mixing" of fluids, such as water, with the grease as the dynamic seal works between the rotary cone and the journal, thus admitting water to the grease which breaks down the grease and accelerates the failure of the bearing surfaces between the cutter cones and the journals.

The above noted objects and advantages of the present invention will be more fully understood upon a study of the following description in conjunction with the detailed drawings.

DESCRIPTION OF THE PREFERRED EMBODIMENTS AND BEST MODE FOR CARRYING OUT THE INVENTION

Figure 1:
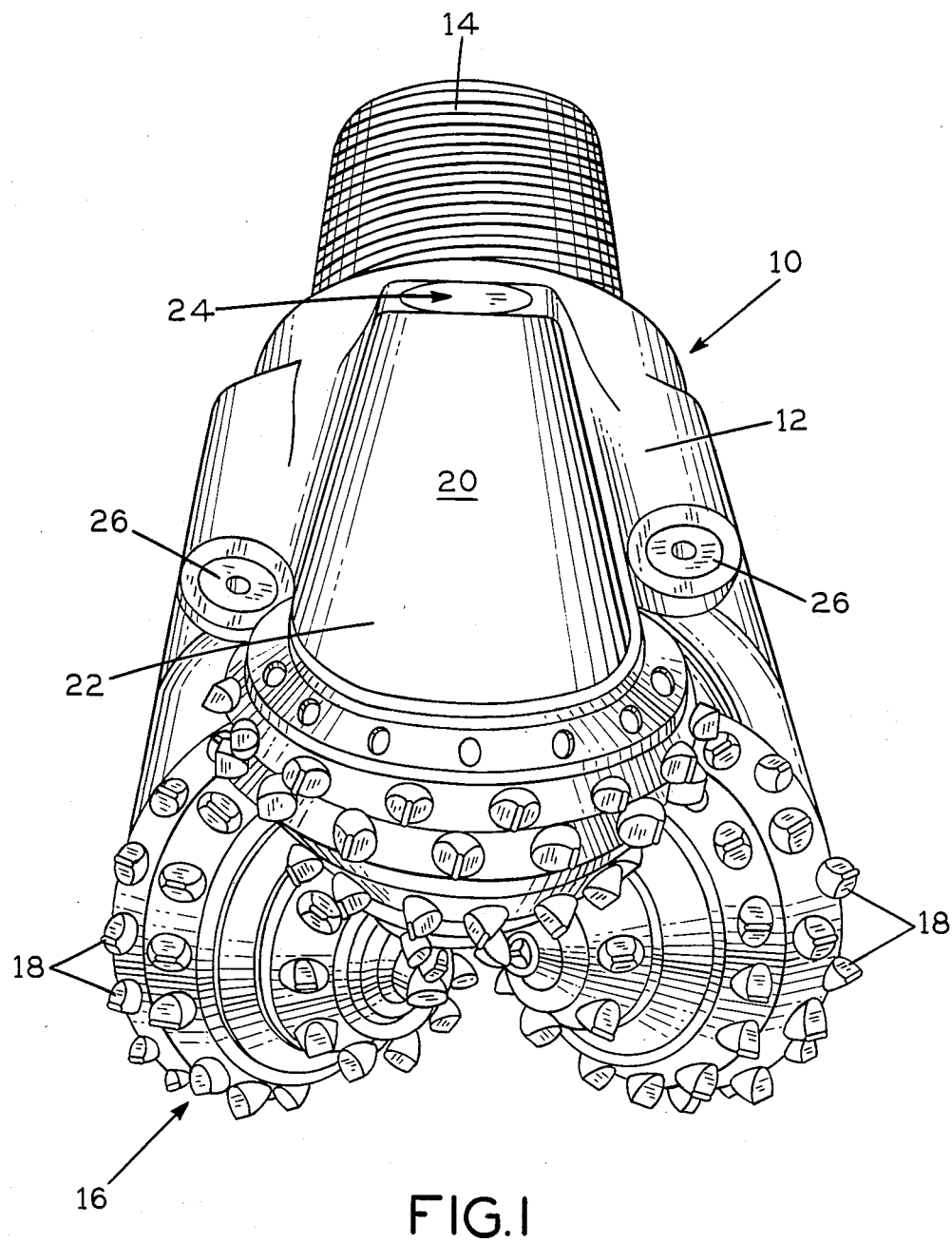
FIG. 1 is a perspective view of a typical three cone sealed bearing rock bit.

With reference now to FIG. 1, the sealed rotary cone rock bit, generally designated as 10, consists of rock bit body 12, pin end 14, and the cutting end comprising three rotary cutter cones, generally designated as 16. Each of the cones are attached to a leg 20 that terminates in a shirttail portion 22. Each of the cones has a multiplicity of equally spaced tungsten carbide inserts 18 interference fitted within the cone bodies. Three or more nozzles 26 communicate with a chamber inside the bit body 12 that receives drilling fluid or "mud" through the pin end 14 into the chamber and out through the nozzles 26 during bit operation. A lubrication reservoir, generally designated as 24, is provided in each of the legs 20 to supply lubricant to bearing surfaces formed between the rotary cone and their respective journals.

Figure 2:
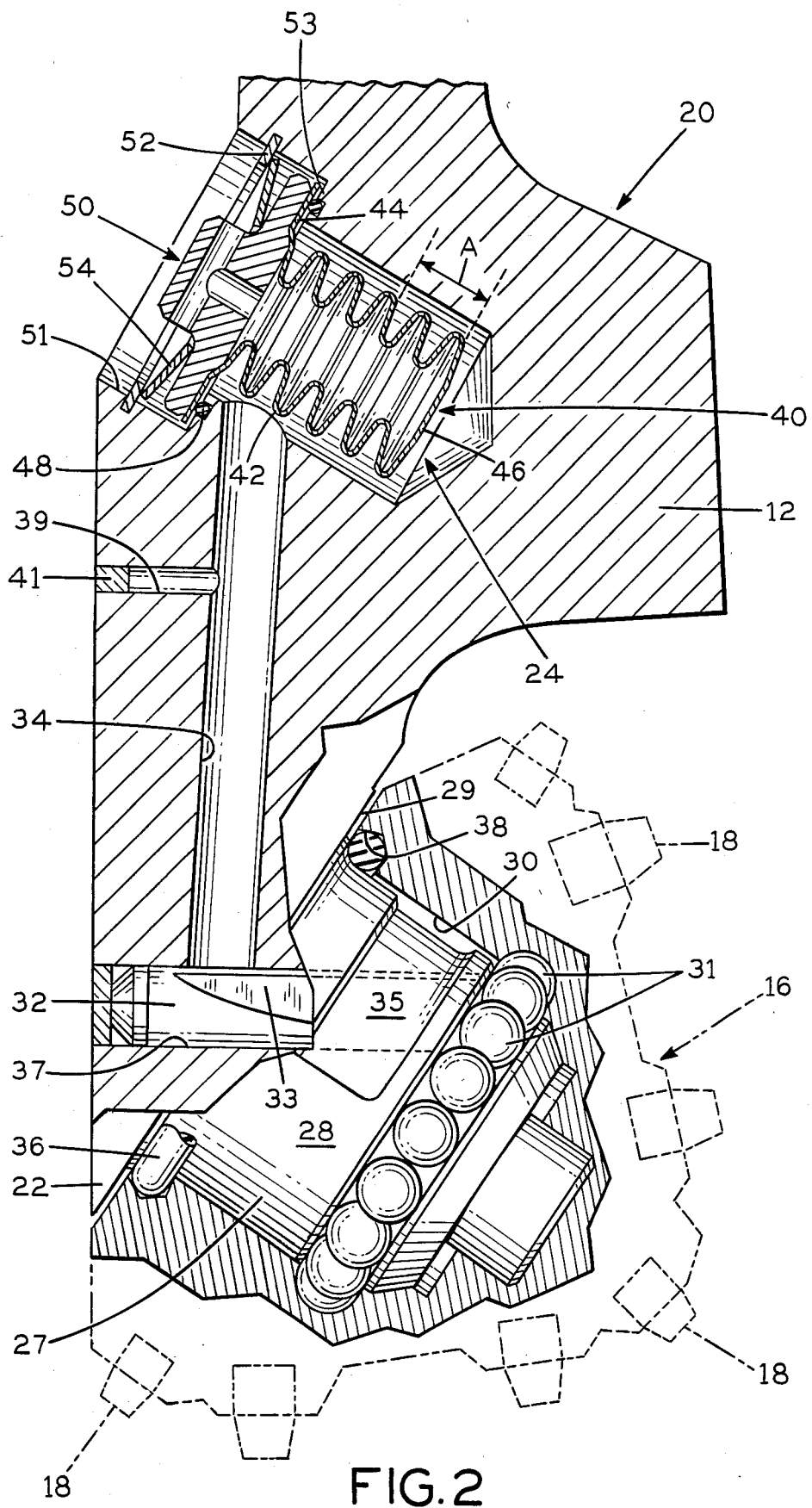
FIG. 2 is a partially cut away view of one leg of the rock bit showing the grease reservoir pressurizing system and its relationship to the bearings between the cutter cone and the journal.

The partially cut away cross section illustrated in FIG. 2 depicts the cone 16 mounted onto a journal pin 27, the journal pin being cantilevered from the shirttail portion 22 of leg 20. A bearing surface 28 is formed on the journal pin 27. The journal also forms a race for cone retention balls 31. A complementary cone retention ball race is formed in the cone 16. A rubber O-ring seal 36 is positioned within glands formed between the journal 27 and the cone 16. The O-ring is constrained axially by the leg backface 29 and the gland 38 formed in cone 16. The cone 16 is secured to the journal 27 by cone retention balls 31. The cone is first slipped over the journal so that the race in the cone aligns with the ball race in the journal. When the two ball races are so aligned, the balls are dropped through ball hole 37 through shirttail 22. When the races are full of cone retention balls, a ball plug 32 is placed in the ball hole 37, closing out the ball race in the journal 27. The ball plug 32 is usually welded in place after the cone is rotatively secured to the journal 27.

A grease reservoir 24 is formed in the leg 20 near the pin end 14 of the bit. The reservoir 24 communicates with the bearings 28 and 30 via passageway 34. Lubricant passes from the reservoir 24, down the passageway or channel 34, into the ball hole 37. Relieved portion 33 in the ball plug 32 allows grease to get to the bearings 28 and 30 formed by the journal and the cone. Relieved channel 35 in journal 27 is provided to form a small grease reservoir for the bearings 28 and 30. A grease reservoir cover cap, generally designated as 50, closes out the reservoir 24 during operation of the bit. The cover cap 50 is secured within reservoir opening 51 against shoulder 53 by a snap ring 52. Positioned between the snap ring 52 and the cover cap 50 is a belleville spring 54, the belleville spring serving to provide a means to relieve excessive internal pressures within the lubrication system during rock bit operation. The cover cap is designed to relieve excessive internal gas pressures between 175 and 200 pounds per square inch. When the pressure range gets this high, the belleville spring pressure will be overcome, allowing the cover cap 50 to lift off shoulder 53 thus relieving the excess pressure past the cover cap.

A metal bellows assembly, generally designated as 40, is comprised of a convoluted body 42 that terminates at a closed end 46 within the reservoir 24. The opposite end of the bellows forms an annular flange 44 that is secured between the cover cap 50 and shoulder 43. An O-ring 48 is placed between the flange 44 and shoulder 53, confined within an annular recess in the shoulder. The O-ring 48 then is in sealing engagement; the lip of the cover cap forcing flange 44 against the compressed O-ring 48.

The metal bellows is preferably fabricated from a high-strength metal alloy. More specifically, it is preferred that the metal bellows be fabricated from an alloy steel, such as AM-350, with a thickness of about seven mils. The preferred bellows material is manufactured by EG&G Sealol, Providence, Rhode Island. In a specific example, for a $7\frac{7}{8}$ inch sealed bearing rock bit, the diameter of the convoluted bellows is about $1\frac{3}{4}$ inches and, in its relaxed state, the length of the bellows is about $1\theta$ inches from flanged end 44 to the opposite closed end 46. The bellows, having the foregoing parameters, may have about nine equidistantly spaced convolutions down its length.

The bellows 40 provide a means to pressurize a viscous grease confined within the lubrication channels and cavities formed within each leg of the bit. It is common practice when filling the bit with grease to evacuate or create a vacuum within all of the grease cavities within the bit by attaching a vacuum pump through grease access hole 39 in the leg 20. After the cavities are evacuated by a vacuum pump (not shown), grease is forced into channel 34, into the grease reservoir 24 and the grease space between bearings 28 and 30 in the bearing package formed between the journal 27 and the cones 16. The grease is pumped into the sealed grease cavities, forcing the convoluted bellows 40 to compress a distance "A" as shown in FIG. 2. The bellows is compressed almost half its length to provide about 100 pounds per square inch positive pressure differential between the internal grease cavities of the leg and the exterior of the leg. By providing a positive pressure differential within the bit of about 100 pounds per square inch, any detritus or fluids, used or formed during downhole drilling operations, are discouraged from entering the bearings between the journal and the cones. Any leakage that might occur will leak from the inside of the lubrication system to the outside of the bit, thus flushing out any detritus that might try to enter the bearing package. Since the cover cap is designed to relieve excessive internal pressures (above 160 pounds per square inch) an internal pressure of about 100 psi should remain stable at least through most of the life of the bit. A plug 41, of course, closes out the grease access hole 39 after each leg of the rock bit is filled with grease and pressurized by the bellows 40.

A benefit of the positive pressure differential within each leg of the bit becomes apparent when the dynamic action of the O-ring seal 36, confined within its gland 38, is analyzed. The pressure differential stabilizes the O-ring during bit operation in that the O-ring is forced axially against the leg backface 29. By forcing the O-ring 36 against the leg backface 29, the dynamic seal will not "snake" or move about, causing a "mixing" of fluids and grease when the rock bit 10 is working in the borehole. When the dynamic seal moves about, it encourages mixing of the waterlike "mud" with the grease. Any water or foreign fluids, mixed with the grease, of course, will cause bearing problems in a very short time. Hence, the positive pressure differential stabilizes the dynamic O-ring seal 36 during operation of the rock bit, obviating the "mixing38 problem observed in the prior art sealed bearing rock bits.

As the bearings become worn during extended operation of the rock bit in an earth formation, the seals become less effective. However, with a positive pressure differential, as taught in the present invention, any leakage will be grease from within the spaces between the bearings to the outside of the bit, thus the grease will carry away any detritus or fluids that might try to get past the dynamic seal 36. The positive pressure differential will force grease out of the bit and not encourage any ingress of foreign material to the bearings during the latter stages of the rock bit life. As long as foreign material is kept out of the bearing package, the rock bit is assured a longer life during rock bit drilling operations.

An obvious advantage of the use of a metal bellows pressurizing system in the grease reservoir is its ability to withstand heat generated during operation of the rock bit. Conventional pressure compensating systems utilize a rubber "boot" that is highly susceptible to heat damage during operation of the bit that usually results in premature failure of the bit.

It would be obvious to form the bellows 40 from other types of metallic alloys than the high-strength steel, such as aluminum alloy. The important thing is that when the bellows is compressed a certain distance, a positive pressure differential is created by the spring forces within the bellows to provide at least 100 pounds per square inch pressure differential between the inside of the bit and the outside atmosphere. A typical pressure differential range would be from about 75 to about 150 pounds per square inch for the bellows.

It would additionally be obvious to add a helical compression spring inside the bellows to increase the operating pressure range without overstressing the bellows (not shown).

It will of course be realized that various modifications can be made in the design and operation of the present invention without departing from the spirit thereof. Thus, while the principal preferred construction and mode of operation of the invention have been explained in what is now considered to represent its best embodiments, which have been illustrated and described, it should be understood that within the scope of the appended cliams, the invention may be practiced otherwise than as specifically illustrated and described.

I claim:

1. A means for pressurizing a bearing lubrication system for a sealed bearing rotary cone rock bit prior to use of said bit in a drilling operation, said rock bit consisting of a bit body with at least one rotary cutter cone rotatively secured to a journal bearing projecting from a leg extending from said body, said pressurizing means comprising:

a grease reservoir chamber formed in said body of said bit, conduit means formed within said body and leg in communication with said reservoir and bearing surfaces formed between said at least one cutter cone and said journal bearing projecting from said leg, seal means positioned between said rotary cutter cone and said journal bearing, a pressure responsive cover cap adapted to release internal pressure in excess of 160 pounds per square inch for said reservoir chamber, a lubricant distributed within said reservoir chamber, conduit means and between said bearing surfaces, and means to pressurize said lubricant within said rock bit lubrication system to establish a positive internal pressure differential to prevent liquid and detritus from entering said bit past said seal and cover cap means to said bearing surfaces during operation of said rock bit, said means to pressurize said lubricant within said reservoir is a convoluted metal bellows entrapped within said reservoir chamber, said convoluted bellows being compressed to exert a predetermined positive pressure differential between 75 and 150 pounds per square inch, the pressure differential is between the internal lube system and the outside of the bit.

2. The invention as set forth in claim 1 wherein said pressure differential is 100 pounds per square inch.

3. The invention as set forth in claim 1 wherein said convoluted metal bellows is fabricated from an aluminum alloy.

4. The invention as set forth in claim 3 wherein said convoluted metal bellows is fabricated from stainless steel.

5. The invention as set forth in claim 4 wherein said convoluted metal bellows is collapsed about one-half its relaxed state length to generate said internal positive pressure differential within said lubrication system.

6. The invention as set forth in claim 5 wherein a helical compression spring is inserted inside the bellows.

* * * * *